United States Patent [19]

Knödel

[11] 4,315,454

[45] Feb. 16, 1982

[54] PISTON FOR A METERING DEVICE AND A METHOD OF PRODUCING SAME

[75] Inventor: Erich R. Knödel, Wertheim-Kembach, Fed. Rep. of Germany

[73] Assignee: Walter Graf u. Co. GmbH & Co., Wertheim am Main, Fed. Rep. of Germany

[21] Appl. No.: 875,155

[22] Filed: Feb. 6, 1978

[30] Foreign Application Priority Data

Sep. 29, 1977 [DE] Fed. Rep. of Germany ....... 2743911

[51] Int. Cl.³ .......................... F01B 29/08; F16J 1/02
[52] U.S. Cl. .................................... 92/170; 92/248; 92/249; 222/386
[58] Field of Search .................... 92/248, 249, 170; 128/218 P, DIG. 14; 277/227, 229, DIG. 6; 29/447; 222/386

[56] References Cited

U.S. PATENT DOCUMENTS

| 730,557 | 6/1903 | McElroy | 128/218 P |
| 1,133,778 | 3/1915 | Wrightson, Jr. | 92/248 |
| 2,607,342 | 8/1952 | Abel | 128/218 P |
| 3,040,712 | 6/1962 | Harrah | 92/170 X |
| 3,303,757 | 2/1967 | Ward | 92/248 X |
| 3,940,027 | 2/1976 | Marterer | 222/309 |
| 3,995,868 | 12/1976 | Smith | 277/DIG. 6 |

OTHER PUBLICATIONS

"Oil-Free Reciprocating Compressors with PTFE Rings", Braun, Engineers' Digest, Aug., 1970, vol. 31, pp. 45, 47, 49, 50.

Primary Examiner—Irwin C. Cohen
Attorney, Agent, or Firm—Fulwider, Patton, Rieber, Lee & Utecht

[57] ABSTRACT

A piston for a metering device with a glass cylinder which comprises a cylindrical core of glass, ceramic or metal and a casing of poly(tetrafluoroethylene) reinforced with 10 to 60 weight percent glass fibers.

3 Claims, 2 Drawing Figures

PISTON FOR A METERING DEVICE AND A METHOD OF PRODUCING SAME

The invention relates to a piston for metering devices of the type specified in the introductory part of claim 1 and a method for producing it.

For the exact dispensing of liquid from storage containers metering devices have long been in use. Such metering devices can be mounted on the storage containers and consist chiefly of a glass cylinder, a piston adapted to slide in it, an inlet valve, an outlet valve and an outlet tube. By means of relative sliding of the piston with respect to the cylinder to perform a suction stroke a specific volume of liquid is drawn out of the storage container into the cylinder; by ensuing relative displacement of the piston in the cylinder in the opposite direction, that is to say in accordance with the force stroke, the drawn-in specific volume of liquid is forced out of the cylinder via the outlet tube into a receptacle. A metering device of this type is therefore substantially a piston slide metering pump.

Metering devices of this type are chiefly used in industrial (such as chemical) laboratories and in medical laboratories. The liquids to be metered off are usually concentrated solutions of chemically aggressive reagents as for example concentrated aqueous mineral acids or alkali metal hydroxides.

In addition to the pronounced aggressiveness of the liquids to be metered, their frequently high concentration and their inclination to form crust deposits on the metering cylinder represent one of the chief problems in the case of such metering devices. As a material for all parts of the metering device, which come into contact with the medium to be measured, the main materials which have become accepted in practice are only glass, oxidic sintered ceramic material and polytetrafluoroethylene (PTFE). The metering cylinder of such metering equipment has for many years in practically all cases been made of glass. It has been known for a long time that the use of a metering piston of glass or ceramic material in a metering cylinder of glass is not suitable for many media to be metered, especially concentrated alkalis. If for example a metering piston or plunger made of glass is ground to fit a metering cylinder with the minimum manufacturing tolerances, it will be found that the piston will seize in the cylinder after a short period of time if used with certain media to be metered as for example a 25% sodium hydroxide solution. If the glass metering piston is made to fit the metering cylinder with a larger tolerance, it admittedly becomes possible to avoid seizing of the metering piston in the metering cylinder for a prolonged period of time, accurate metering however will not be possible owing to inaccuracies on priming. Furthermore the use of greases, even silicone greases, is not possible owing to the aggressiveness of the media to be metered.

The only material which in practice has so far been found acceptable for the sliding surface of metering pistons is PTFE. The use of solid pistons of PTFE is however not possible owing to the high coefficient of thermal expansion of PTFE as compared with glass. The metering devices concerned must in fact be capable of being dried and sterilized, for example in sterilizers at temperatures of approximately 120° C.

In order to avoid these disadvantages there has been a proposal in the prior art, see for example the German specification (Offenlegungsschrift) No. 2,343,687, to produce the metering piston of a ceramic core with a PTFE coating. This coating can be formed in situ, be drawn on as a shrink foil or be applied in some other manner. Owing to the high coefficient of thermal expansion of PTFE such a coating can only be made relatively thin, for example with thicknesses between 0.1 and 0.5 mm. On the application of such coatings by spraying, brushing or dipping adhesion promotors or primers must be utilized, if the PTFE coating is to adhere sufficiently firmly on the glass surface or on the ceramic surface. The metering pistons coated in this manner with PTFE are however not resistant to a whole series of highly aggressive liquids, more particularly aqueous sodium hydroxide. This is due to the fact that such thin PTFE coatings have never been produced completely free of pores. In the case of the utilization of such a metering piston for metering sodium hydroxide the latter will leak through those pores or pinholes and destroy the adhesion promotor. As result detachment and destruction of the PTFE coating will occur within a short time. The use of thicker, pore-free PTFE coatings or solid PTFE pistons is prohibited by the high thermal expansion and the poor dimensional accuracy with which such PTFE pistons can be manufactured. Thus PTFE cannot be ground and polished with the degree of precision requisite for the metering pistons of metering equipment.

The use of shrink foils of PTFE is not possible in practice more especially owing to the disproportionately high price of such foils. Furthermore such foils as a general rule have to be applied with the use of an adhesion promotor if they are to have the necessary long-term mechanical strength. In this respect however the disadvantages mentioned already occur again. If the shrink foil is applied without the use of an adhesion promotor to the ceramic piston, such pistons cannot be dried as often as is required using conventional drying cupboard temperatures lying between approximately 110° and 115° C. The shrunk foil is subject to fatigue and becomes thermally stressed so that the piston is no longer serviceable.

In view of this prior art the invention has the aim of providing a metering piston for a metering device with a glass cylinder of the initially mentioned type, which can be used for indefinite periods of time with all aggressive media, which do not decompose glass and ceramic materials and more particularly can be indefinitely used for the metering of concentrated alkali metal hydroxides. Furthermore the piston is to be mechanically sturdy and cheap to manufacture.

Figure 1:
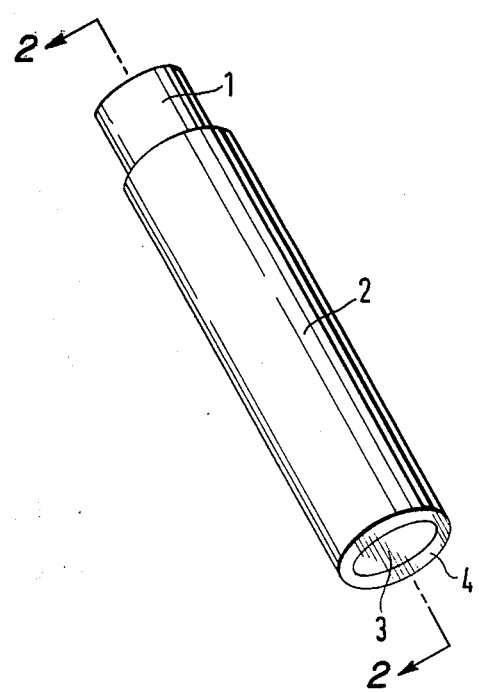
FIG. 1 is a perspective view of the metering dispenser piston.

The glass fiber reinforced polytetrafluoroethylene (GFPTFE) used as a casing of the metering piston has, in accordance with the degree of filling with glass, a coefficient of linear thermal expansion which is approximately 20–50% lower than that of unfilled PTFE. Therefore in the case of customary piston diameters lying between approximately 10 and 100 mm it can readily be used with casing wall thicknesses between 1 and 3 mm. In the case of such wall thicknesses between the surface of the core, consisting of glass or ceramic material, of the piston and the inner surface of the piston casing, it is not necessary to use any adhesion promotor, and the casing of the metering piston is therefore, irrespectively of the principle of the method used, absolutely free of continuous canal pores in the case of such wall thickness and can be permanently fixed on the piston core in such a manner that it will not be displaced.

The coefficient of linear thermal expansion, which as compared with that of unreinforced PTFE is substantially lower, of GFPTFE alone would however not in itself be sufficient to produce completely robust PTFE-encased metering pistons. A substantial further factor, which has made such production possible, is the fact that GFPTFE, in contrast to non-reinforced PTFE, can be surprisingly ground and polished with the same degree of accuracy as can be achieved with glass. This opens up the possibility of firstly applying the GFPTFE casing with a sufficiently large oversize on the glass core or ceramic core and then precision grinding the semi-finished piston after conclusion of all other method steps in a manner as used for glass pistons.

Owing to the fact that the casing can be applied to the core using GFPTFE as a material with even larger wall thicknesses, for production of the casing it is possible to use preformed GFPTFE shaped or molded material, which can be applied for example by thermal shrinkage or autofrettage onto the core. The costs for such semi-manufactured materials are approximately 70–80% below the costs of PTFE shrinkage foil as proposed in the prior art.

Normally the GFPTFE should not comprise less than 10% by weight and not more than 60% by weight of glass fibers. In the case of a percentage by weight of less than 10 of glass fibers the coefficient of thermal expansion will be too large, the adhesion of the material on the glass core would be impaired and the casing can no longer be precision ground. In the case of a percentage by weight of above 60 for the glass fibers in the GFPTFE the same surface changes and seizing occur as is the case with the use glass pistons in glass cylinders when the metering device is used in conjunction with sodium hydroxide solution.

In accordance with the further development of the invention the casing of the metering piston preferably consists of GFPTFE reinforced with 20–30% by weight or more particularly approximately 20% by weight of glass fibers.

The invention is thus based on the basic principle of departing from conventional practice in the production of metering pistons, that is to say from the customary use of coating with PTFE and having recourse to the use of a massive compound body made out of a piston core and a reinforced or filled, relatively massive PTFF tube. The reinforced PTFE tube is in this respect prefabricated as semi-manufactured material independently from the core and connected with the latter preferably by thermal shrinkage to form a massive or solid compound body.

For the reinforced PTFE used for this purpose it is important to fulfill three conditions, that is to say (1) the PTFE should be chemically as inert and resistant as unreinforced PTFE, (2) it should have a substantially smaller coefficient of linear thermal expansion than unreinforced PTFE and (3) in contrast to unreinforced PTFE it should be capable of being ground with the same degree of precision as glass. These three properties are achieved in an optimum fashion by the present invention using glass fibers reinforced PTFE. Comparable properties can however also be attained with some other fillers or additives as for example glass powder, carbon fibers, graphite fibers, carbon powder, graphite dust or some other highly inert inorganic oxides or carbides in a fiber or powder form. These modifications of the invention are regarded as being technically equivalent and considered to come within the scope of the invention. As regards the chemical resistance and the extremely satisfactory grindability of the material, which is on a par with the grindability of glass, GFPTFE has been found to be a particularly preferable material for the production of the metering piston casing.

More especially in the case of large piston diameters it is preferred to construct the GFPTFE casing as a tube which is left open ended, so that at the working end or surface of the metering piston the end face, surrounded by the end face of the GFPTFE casing, of the glass core or ceramic core is left exposed. More especially in the case of large piston diameters (approximately 30–100 mm) this leads to an increased thermal stability as regards the dimensions of the metering piston. Any diffusion in of aggressive molecular components of the liquid to be metered along the interface between the core and the casing will not in this respect lead to any damage, since the casing is seated directly on the core, that is to say no change in the material can occur at the interface. Furthermore diffusion-leakage, which under some circumstances may give raise to difficulties, of the molecules, which have diffused into the interface, through the casing in a radial direction, need not be feared, since the casing, in the case of a thickness of preferably approximately 1 mm, is absolutely free of continuous channel pores.

For the production of the piston use if preferably made of GFPTFE semi-manufactured material, and more particular a tube material, whose internal diameter is slightly smaller, generally approximately 1–8% and preferably 2–3% smaller, than the external diameter of the core and whose external diameter is somewhat larger, for example 2–20% and preferably 5–15% larger than the nominal diameter of the finished piston. This semi-manufactured material is applied to the core by thermal shrinkage, without an adhesion promotor having to be employed. In this respect this shrinkage is due to thermal contraction only and is clearly to be distinguished by a shrinkage on of shrinkage foils in accordance with the prior art, in the case of which shrinkage is brought about by a thermally triggered texture reversal.

For shrinking of the GFPTFE tube onto the glass core or ceramic core, the GFPTFE tube is cut to the desired casing length and then evenly heated, preferably to a temperature between possibly 190° and 250° C. At this temperature the GFPTFE tube is then drawn onto the GFPTFE tube which is at ambient temperature (15°–30° C.), after cooling down the GFPTFE casing is ground like a glass piston to the precisely desired size.

The pistons so produced are mechanically sturdy and even their precision ground surface is extremely resistant to damage and can be used for idefinite periods with any medium to be metered, which does not attack the material employed itself. More particularly this piston can be used in conjunction with glass cylinders without the least impairment in long-term operation for metering alkali metal hydroxide solutions. This metering operation has not so far been possible with known metering devices.

Figure 2:
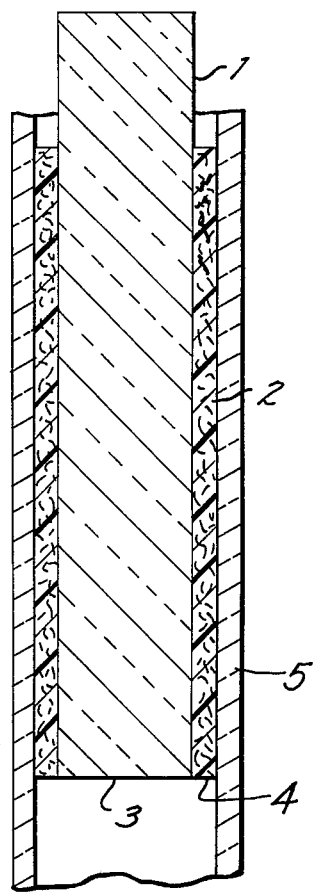
FIG. 2 is a sectional view of the metering dispenser piston taken along the section line 2—2 of FIG. 1, showing a cylindrical core and a glass fiber impregnated polytetrafluoroethylene casing.

An embodiment of the invention is represented in the drawing. FIGS. 1 and 2 show a metering piston, which consists of core 1 and casing 2. Glass metering cylinder 5 is depicted in FIG. 2. The lower end face in the drawing of the cylindrical piston there is the working surface 5 of the piston which delimits the stroke volume in the metering cylinder. GFPTFE casing 2 is a tube which is also open at the working end of the piston. The plane-ground working surface is thus constituted by exposed endsurface 3 of core 1 and end surface 4, concentrically surrounding the latter, of GFPTFE casing 2.

What is claimed is:

1. A metering dispenser comprising a piston slidable in a glass cylinder, said piston comprising n elongated cylindrical core consisting of glass or ceramic material and a casing of polytetrafluoroethylene characterized in that the casing consists of a prefabricated elongated massive uniform tube of polytetrafluoroethylene reinforced with 20–40% by weight of glass fibers sufficient to reduce the coefficient of linear thermal expansion of said casing by 20 to 50 percent from that of unfilled polytetrafluoroethylene and having a wall thickness between about 1 and 3 mm, with said tube being thermally shrunk on the cylindrical surface of said core without an adhesion promoter effecting a casing texture reversal and said casing having an external diameter substantially equal to the internal diameter of said glass cylinder.

2. A piston in accordance with claim 1 characterized in that the casing consists of polytetrafluoroethylene reinforced with 20–30% by weight of glass fibers.

3. A piston in accordance with claim 1 or claim 2 characterized in that the casing is open ended at the working end of the piston.

* * * * *